(12) United States Patent
Brush et al.

(10) Patent No.: US 7,953,796 B2
(45) Date of Patent: May 31, 2011

(54) SHARING CONTENT USING SELECTION AND PROPOSAL

(75) Inventors: Alice Jane Bernheim Brush, Bellevue, WA (US); Kori Marie Quinn, Redmond, WA (US); Kimberly Eleanor Tee, Calgary (CA)

(73) Assignee: Microsoft Corporation, Redmond, WA (US)

( * ) Notice: Subject to any disclaimer, the term of this patent is extended or adjusted under 35 U.S.C. 154(b) by 170 days.

(21) Appl. No.: 12/060,882

(22) Filed: Apr. 2, 2008

(65) Prior Publication Data
US 2009/0254614 A1 Oct. 8, 2009

(51) Int. Cl.
*G06F 15/16* (2006.01)

(52) U.S. Cl. ........................................ 709/204

(58) Field of Classification Search .................. 709/204
See application file for complete search history.

(56) References Cited

U.S. PATENT DOCUMENTS

| | | | |
|---|---|---|---|
| 6,832,242 B2 | 12/2004 | Keskar | |
| 7,234,117 B2 | 6/2007 | Zaner et al. | |
| 7,630,544 B1 * | 12/2009 | Zhou | 382/164 |
| 7,631,252 B2 * | 12/2009 | Hertzfeld et al. | 715/201 |
| 7,631,253 B2 * | 12/2009 | Hertzfeld et al. | 715/201 |
| 7,778,926 B1 * | 8/2010 | Grinchenko et al. | 705/50 |
| 2002/0161603 A1 * | 10/2002 | Gonzales | 705/1 |
| 2003/0076353 A1 | 4/2003 | Blackstock et al. | |
| 2003/0156138 A1 * | 8/2003 | Vronay et al. | 345/772 |
| 2004/0068521 A1 | 4/2004 | Haacke et al. | |
| 2004/0085578 A1 * | 5/2004 | Quek et al. | 358/1.18 |
| 2004/0267625 A1 | 12/2004 | Feng et al. | |
| 2005/0052685 A1 * | 3/2005 | Herf et al. | 358/1.15 |
| 2005/0169499 A1 * | 8/2005 | Rodriguez et al. | 382/100 |
| 2005/0234864 A1 | 10/2005 | Shapiro | |
| 2005/0246374 A1 * | 11/2005 | Blinn et al. | 707/104.1 |
| 2006/0078201 A1 * | 4/2006 | Kim et al. | 382/181 |
| 2006/0174205 A1 * | 8/2006 | Jung et al. | 715/751 |
| 2006/0235926 A1 * | 10/2006 | Naruse | 709/203 |
| 2006/0268120 A1 * | 11/2006 | Funakura et al. | 348/231.2 |
| 2007/0129817 A1 | 6/2007 | Cadiz et al. | |
| 2007/0157107 A1 | 7/2007 | Bishop | |
| 2007/0157114 A1 * | 7/2007 | Bishop et al. | 715/787 |

(Continued)

FOREIGN PATENT DOCUMENTS
WO 2007082167 A2 7/2007

OTHER PUBLICATIONS

"Phanfare: Photo and Video Sharing for Families—AppScout", http://www.appscout.com/2008/01/phanfare_photo_and_video_shari.php.

(Continued)

*Primary Examiner* — Firmin Backer
*Assistant Examiner* — James Edwards

(57) ABSTRACT

A system may facilitate "almost automatic" sharing of content by regularly selecting content to be shared, and by publishing the content to certain entities if a person agrees, or does not object, to the sharing. A content item may be selected based on a criterion. A proposal to share the content item then may be displayed to a person. The proposal may specify a time by which the content item will be published if the proposal is not rejected. The person may explicitly accept or reject the proposal, or may passively allow the content to publish by not rejecting the proposal before the specified time. The content may be published so as to be receivable by a set of one or more entities that have been designated to receive shared content items.

20 Claims, 6 Drawing Sheets

U.S. PATENT DOCUMENTS

| | | | |
|---|---|---|---|
| 2007/0162845 A1* | 7/2007 | Cave et al. ............... 715/530 |
| 2007/0168463 A1 | 7/2007 | Rothschild | |
| 2007/0236505 A1* | 10/2007 | Jung et al. ............... 345/589 |
| 2008/0009272 A1 | 1/2008 | Toledano | |
| 2008/0133697 A1* | 6/2008 | Stewart et al. ............ 709/217 |
| 2008/0174676 A1* | 7/2008 | Squilla et al. ............. 348/231.6 |
| 2008/0175103 A1* | 7/2008 | Nakamura et al. ............ 368/10 |
| 2008/0177617 A1* | 7/2008 | Gupta ............... 705/10 |
| 2008/0201734 A1* | 8/2008 | Lyon et al. ............... 725/34 |
| 2009/0097361 A1* | 4/2009 | Nakamura et al. ............ 368/29 |
| 2009/0161962 A1* | 6/2009 | Gallagher et al. ............ 382/203 |
| 2010/0042648 A1* | 2/2010 | Cannon et al. ............ 707/104.1 |

OTHER PUBLICATIONS

"Powersnap: A Powerful New Free Application Enables the First True Peer-to-Peer Photo and Image Networks", Jan. 23, 2007, http://www.powersnap.com/news.html.

Mossberg, et al., "A New and Simple Way to Share Digital Photos" Apr. 26, 2006. http://solution.allthingsd.com/20060426/sharing-digital-photos.

"Photo Sharing 2.0", http://www.jakeludington.com/digital_lifestyle_report/20060213_photo_sharing20.html.

Liechti, et al., "A Digital Photography Framework Enabling Affective Awareness in Home Communication", Personal and Ubiquitous Computing, 2000, pp. 4-24, vol. 4.

Brush, et al., "'Today' Messages: Lightweight Support for Small Group Awareness via Email", Proceedings of the 38th Hawaii International Conference on System Sciences—2005. pp. 1-10.

Hindus, et al., "Casablanca: Designing Social Communication Devices for the Home", SIGCHI'01, Mar. 31-Apr. 4, 2001, Seattle, WA, USA. pp. 325-332.

Kaye, et al., "Communicating Intimacy One Bit at a Time", CHI 2005, Apr. 2-7, 2005, Portland, Oregon, USA. pp. 1529-1532.

Rettie, "Connectedness, Awareness and Social Presence"6th International Presence Workshop, Aalborg.2003. 7 Pages.

Romero, "Connecting the Family with Awareness Systems", Personal and Ubiquitous Computing, Apr. 2007, pp. 299-312, vol. 11, No. 4.

Mynatt, et al., "Digital Family Portraits: Supporting Peace of Mind for Extended Family Members", CHI Mar. 31-Apr. 5, 2001, Volume No. 3, Issue No. 1. pp. 333-340.

Dey, et al., "From Awareness to Connectedness: The Design and Deployment of Presence Displays", CHI 2006 Proceedings—Awareness and Presence. Apr. 22-27, 2006. Montreal, Quebec, Canada. pp. 899-908.

Grudin, "Groupware and Social Dynamics: Eight Challenges for Developers", Communications of the ACM, Jan. 1994, pp. 92-105, vol. 37, No. 1.

Neustaedter, et al., "Interpersonal Awareness in the Domestic Realm", Proc. OZCHI (Sydney, Australia, Nov. 20-24), 2006, pp. 15-22.

Neustaedter, et al., "'LINC-ing' the Family: The Participatory Design of an Inkable Family Calendar", Proc. ACM CHI 2006 (Apr. 22-27, 2006, Montreal, Quebec, Canada), 2006, pp. 141-150.

Frohlich, et al., "Requirements for Photoware", Proc. ACM CSCW02 (Nov. 16-20, 2002, New Orleans, Louisiana), 2002, pp. 166-175.

Plaisant, et al., "Shared Family Calendars: Promoting Symmetry and Accessibility", ACM TOCHI, Sep. 2006, pp. 313-346, vol. 13, No. 3.

Hutchinson, et al., "Technology Probes: Inspiring Design for and with Families", Proc. ACM CHI, 2003, pp. 17-24.

Consolvo, et al., "The CareNet Display: Lessons Learned from an In Home Evaluation of an Ambient Display", Proc. Ubicomp, 2004, pp. 1-17.

Smale, et al., "Transient Life: Collecting and sharing personal information", Proc. OZCHI (Sydney, Australia, Nov. 20-24), 2006, pp. 31-38.

Kirk, et al., "Understanding Photowork", Proc. ACM CHI 2006 (Apr. 22-27, 2006, Montreal, Quebec, Canada), 2006, pp. 761-770.

Miller, et al., "Give and Take: A Study of Consumer Photo-Sharing Culture and Practice", Proc. ACM CHI 2007 (Apr. 28-May 3, 2007, San Jose, CA), pp. 347-356.

Venkatesh, "The Tech-Enabled Networked Home: An Analysis of Current Trends and Future Promise," in Transforming Enterprise: The Economic and Social Implications of Information Technology (William H. Dutton, et al., eds.), MIT Press, 2005, pp. 413-435.

* cited by examiner

SHARING CONTENT USING SELECTION AND PROPOSAL

BACKGROUND

Many people like to share content with their personal contacts, such as family members. Photos and calendar events are examples of content that may be shared, although other types of information could also be shared. Regular sharing of content helps people to keep up with what is going on in each other's lives, and may foster a general sense of connectedness.

Many people do not frequently share content because of the effort involved. In theory, computers simplify the process of sharing content. For example, instead of having many prints made of a photographic negative and sending the prints physically by mail, one could e-mail a digital picture or could post the picture on a web site to be viewed by others. Also, instead of writing a letter to share upcoming events, one could e-mail calendar entries or could make one's electronic calendar visible to others. However, sharing content in these ways generally involves making the effort to select the content to be shared and/or to initiate sharing of the content.

SUMMARY

Sharable content may be stored on a person's computer or in some other location. For example, photos could be stored in a directory of images, and calendar events could be stored in a calendar file. A system may select content to be shared from among the stored content, and may make a proposal to share the content. For example, the system may select a photo and the next three calendar events. The system may then propose to share the photo and the events with other entities at a specified time. The person who owns the content could accept the proposal, or could reject sharing of one or more content items in the proposal. The person could also allow the proposed content items to be shared by allowing the specified time to pass without rejecting the proposal.

The entities with which content is to be shared could be chosen in any manner. For example, a person could designate family members. Or, people could mutually agree to participate in a sharing group in which they share content with each other. Different entities could receive different items of content. The particular entities that are chosen to receive particular items of content could be chosen based on various factors.

A system could perform a regular cycle of proposing content to be shared. For example, a "photo of the day" could be selected each morning. Each day, the photo could be shown in a window on a display as part of a proposal to share that photo at a particular time (e.g., at noon).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

People may wish to share content, but may wish to do so without the effort of selecting the content to be shared, and without having to e-mail the content or post the content on a web site. For example, a person might wish to send photos regularly to his or her extended family members. Some people enjoy the process of regularly selecting photos and e-mailing them to family. However, other people do not and may share photos every few weeks or months. For example, they may share photos after a big event such as a vacation or may wait until the memories on their digital cameras have filled up before copying the photos to their computer's disk. Similarly, people may wish to share events from their calendar as a way of letting their personal contacts know what is happing in their lives. However, if sharing these events involves making the effort to e-mail the events, some people will share events infrequently. It is possible to make one's electronic calendar visible to another person. However, calendars often store both private and non-private events, so people may be reluctant to make their entire calendars visible to others.

The subject matter described herein may assist people in sharing content frequently. A system may be implemented that selects content and proposes to share the content. A person (the sharer) may examine the proposal, and may determine which content is to be shared with others (the sharees). For example, the system could propose a "photo of the day", and upcoming calendar events, to be shared. The sharer could accept the photo, or ask that a new photo be chosen. The person could accept the calendar events, or reject sharing of one or more of the events. In addition to photos and calendar events, any other type of content could be chosen for sharing. For example, the system could be used to keep grandparents up to date on what their children are doing. The system could keep track of: which videos the grandchildren have viewed (e.g., by retrieving this information from a set-top box or other media system); which web sites the grandchildren have visited (e.g., by retrieving this information from the browsing history on a family computer); or what other events the children have participated in (e.g., by mining this information from a machine vision system installed in the home, or from any other data-gathering device). Any type of content could be selected and proposed for sharing.

Some systems that purport to simplify sharing of content focus on organizing content, and on making the content easy to view and navigate after content has been selected. However, the subject matter described here may be used to facilitate the process of selecting content to share, and may also serve as a substitute for the human initiative (e.g., creating an e-mail or uploading to a web site) that content sharing would normally involve.

Figure 1:
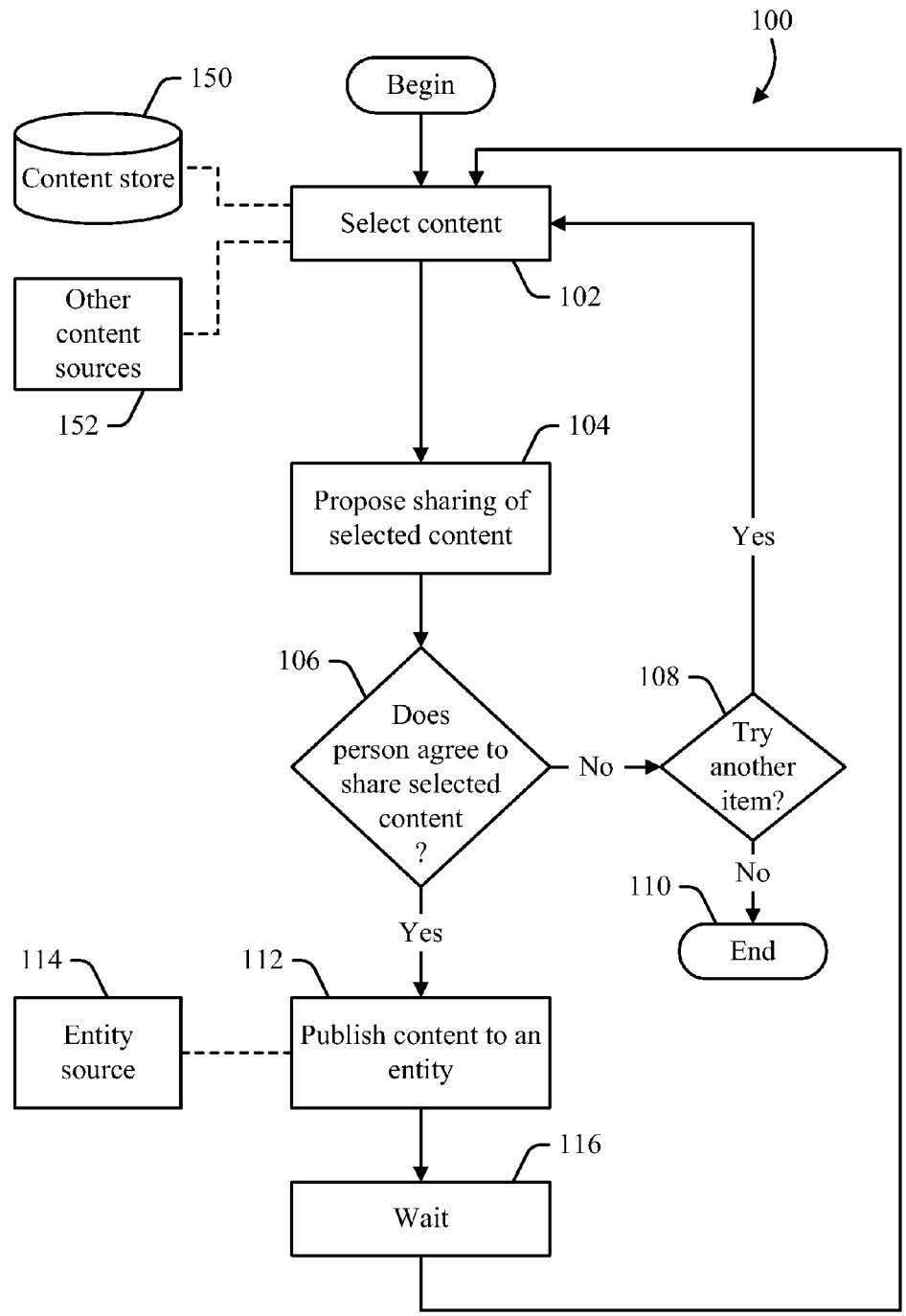
FIG. 1 is a flow diagram of an example process in which content is chosen for sharing.

Turning now to the drawings, FIG. 1 shows an example process 100 in which content is chosen for sharing. The process of FIG. 1 may be carried out using components described herein, but could be carried out in any system. Additionally, FIG. 1 shows an example in which stages of a process are carried out in a particular order, as indicated by the lines connecting the blocks, but the various stages shown in these diagrams can be performed in any order, or in any combination or sub-combination.

Figure 2:
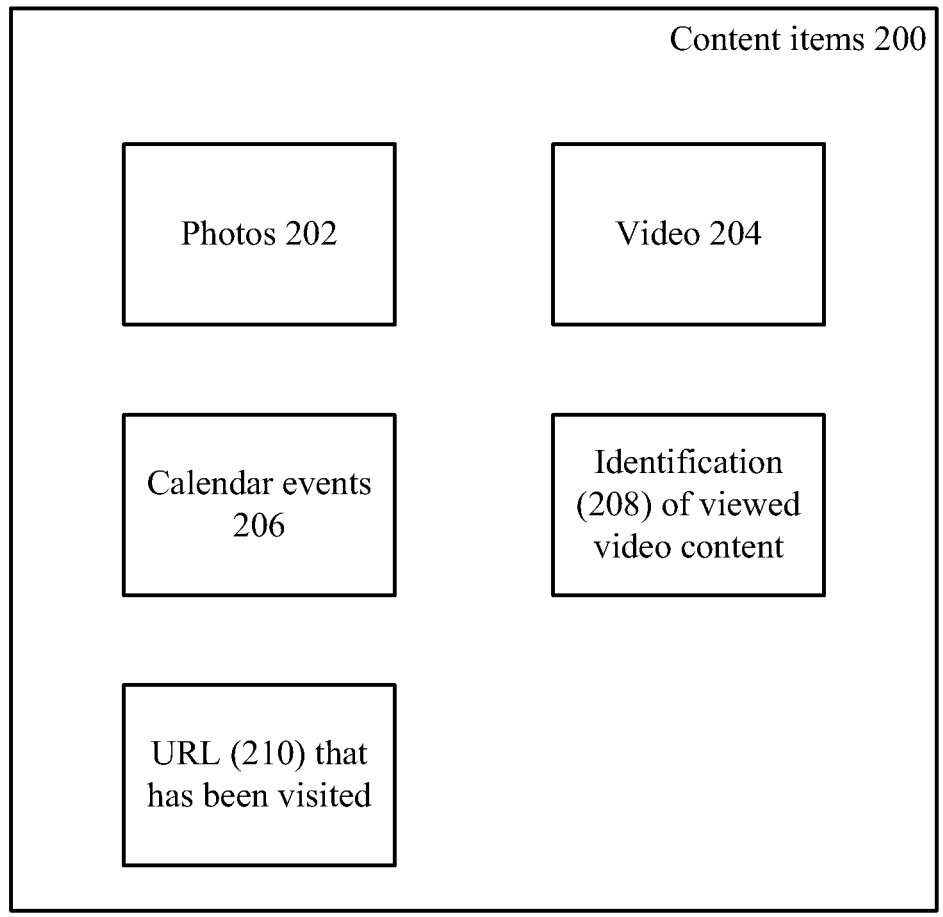
FIG. 2 is a block diagram of example content items.

At 102, one or more items of content are selected. The selected content may be any type of content, such as images (photographic or otherwise), events from a calendar, or any other type of content. Some example types of content are shown in FIG. 2 and are discussed below.

The content may be selected from a content store 150, or from any other source(s) 152. For example, items of content may be photographic images that are stored in a directory of photos. In this case, the directory of photos is an example of content store 150. However, content store 150 could store any type of content, such as video, audio, etc. Some types of content may come from a source other than a content store. For example, an event on a calendar is an example of an item of content that could be shared. Thus, the calendar and the file in which it is stored are examples of sources from which content may be selected.

After content has been selected, sharing of the selected content may be proposed (at 104). For example, a selected item of content (e.g., a photo) may be displayed in a window on a computer. The item may be displayed along with a statement, such as "This photo will be shared at 12:00 p.m." The display may offer the person the chance to accept or reject sharing, or to select a new photo. Similarly, a calendar item could be displayed, along with an opportunity to reject sharing of the calendar item. Presenting a content item, along with a chance to reject sharing of the item, is an example of a proposal to share the item.

At 106, it is determined whether the person agrees to share the content for which sharing has been proposed. The existence (or lack thereof) of such agreement may be determined in any manner. For example, as noted above, there may be a time (e.g., 12:00 p.m.) after which sharing will occur unless the proposal to share is rejected before that time. As other examples, a person may explicitly accept or reject a proposal to share, or may accept sharing of some content items and may reject sharing of others. Explicit approval of proposed sharing, as well as the non-receipt of a rejection prior to the proposed sharing time, are examples of circumstances in which a proposal to share has not been rejected.

If the person does not provide an indication of agreement to share the selected content, then either another content item may be tried, or the process may end without sharing. A system that implements process 100 may take either approach. If it is determined (at 108) that another content item is to be tried, then process 100 returns to 102 to select a new content item. On the other hand, if another content item is not to be tried, then the process ends (at 110) without sharing the content that was the subject of the rejected proposal.

Figure 4:
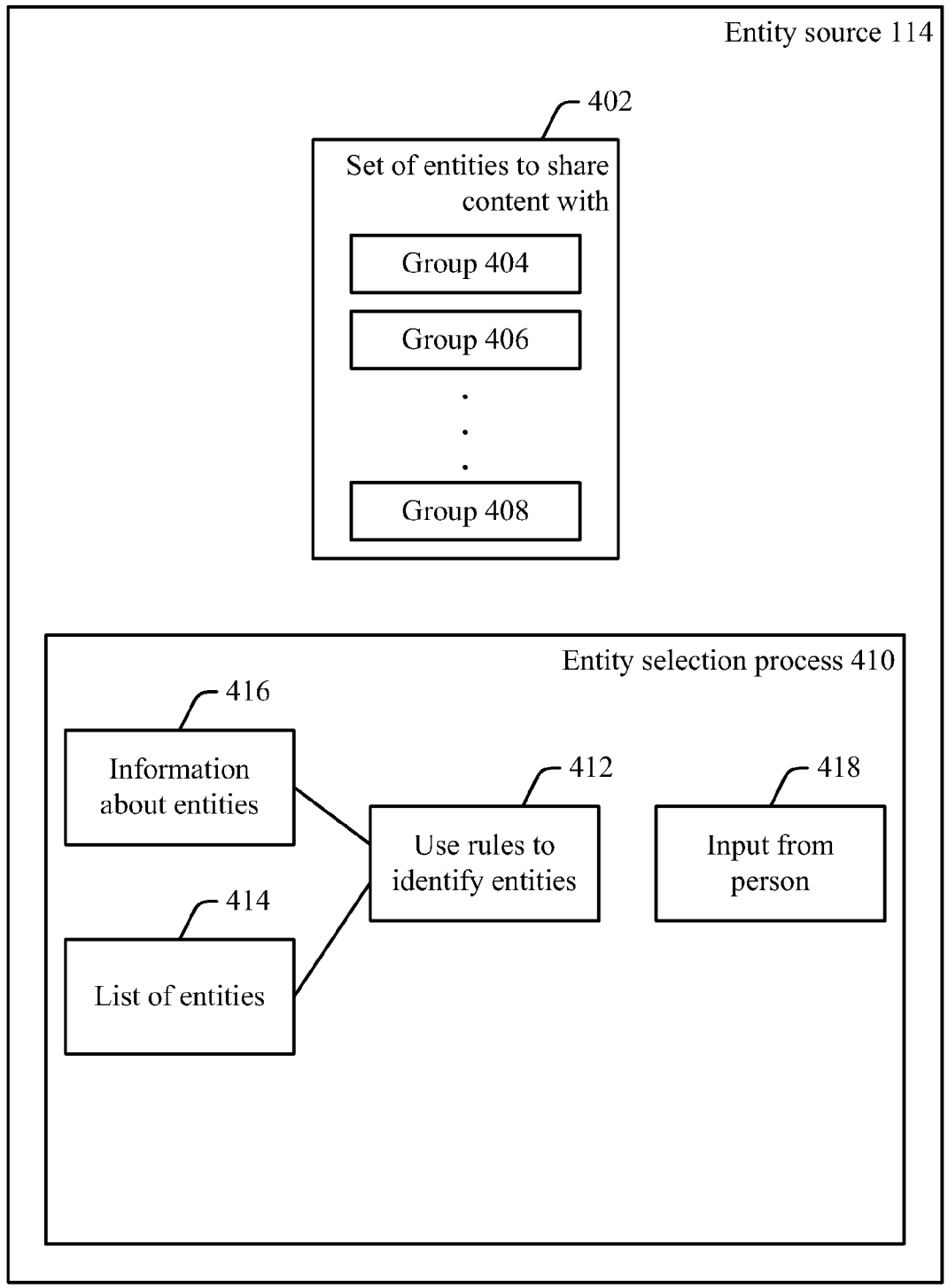
FIG. 4 is a block diagram of example data and/or processes that may make up an entity source.

Returning to discussion of 106, if the person agrees to share the selected content, then the content is published (at 112) to an entity. An entity may be a person, or may be any other type of entity. The particular entity(ies) with which content is to be shared may be chosen from an entity source 114. For example, there may be a list of entities that have previously been designated as recipients (or potential recipients) of shared content, or there may be a pre-existing list of entities (e.g., an e-mail contacts list) and some set of rules that governs how entities are chosen from that list to receive shared content. Examples of entity sources are shown in FIG. 4 and are discussed below.

The publication of content may take any form. For example, content items (e.g., images, calendar events, etc.) may be transmitted from the sharer's machine to the sharee's machine via a network. Or, there may be a server that administers a sharing framework, where a client application on the sharer's machine notifies the server which content has been approved for sharing, and which entities have been approved to receive the shared content. A client application that runs on the sharee's machine may receive notification that shared content is ready, and the sharee's machine may then retrieve the content. The shared content could be uploaded to the server so that the sharee retrieves the content from the server. Or, the server may inform the sharee that content is available on the sharer's machine, and the sharee's machine may then obtain the content from the sharer's machine. These mechanisms are examples of how publication may be implemented. However, publication of shared content could be implemented in any manner.

After content has been published, process 100 may wait (at 116) for some amount of time, and may then return to 102 to repeat the cycle of selecting content and proposing to share the selected content. For example, process 100 could be performed once a day in order to share a "photo of the day", or daily calendar events, or any other type of content. Process 100 could recurrently be performed every other day, once a week, or at any other regular or irregular intervals.

As noted above, any type of content items may be shared. FIG. 2 shows some example content items 200.

Content items 200 may take the form of photo 202, video 204, calendar event 206, an identification (208) of video content that has been viewed, a Uniform Resource Locator (URL) (210) that has been accessed, or any other type of content.

Photo 202 is an example of an image. It may reside in the "photos" or "pictures" folder on a computer. Photo 202 may have been captured using a digital camera, or may be a scan of an image captured on film. Video 204 comprises moving pictures, such as content that satisfies the Moving Picture Experts Group (MPEG) format, the Musical Video Interactive (MVI) format, or any other format. Calendar events 206 are events (e.g., one-time events, multi-day events, recurring events, etc.) that may be stored on a calendar. The calendar, for example, may be a calendar associated with an e-mail program, an on-line calendar, or any other type of calendar.

Identification 208 of video content indicates particular video content items (e.g., movies, television shows, viral videos, etc.) that have been viewed. In one example context, the subject matter herein may be used to help extended families share personal information. In some cases, one family member may want to learn what another family member is interested in, as a way of keeping up with an extended family member's interests. (E.g., grandparents may wish to know what videos or television programs their grandchildren watch, so they can mention those videos to their grandchildren when they see the grandchildren in person.) In this case, the identity of the video that has been watched may be a type of content that could be shared. Similarly, a particular URL 210 that has been visited is another example of content that could be shared. (Like a video that has been viewed, a URL that has been visited may also allow one family member to learn of another family member's interests. However, the identities of videos that have been viewed, or URLs that have been visited, could be shared for any reason and in any context and are not limited to the example of an extended family scenario.)

The items shown in FIG. 2 are non-limiting examples of content items 200. Any type of content item could be used.

Figure 3:
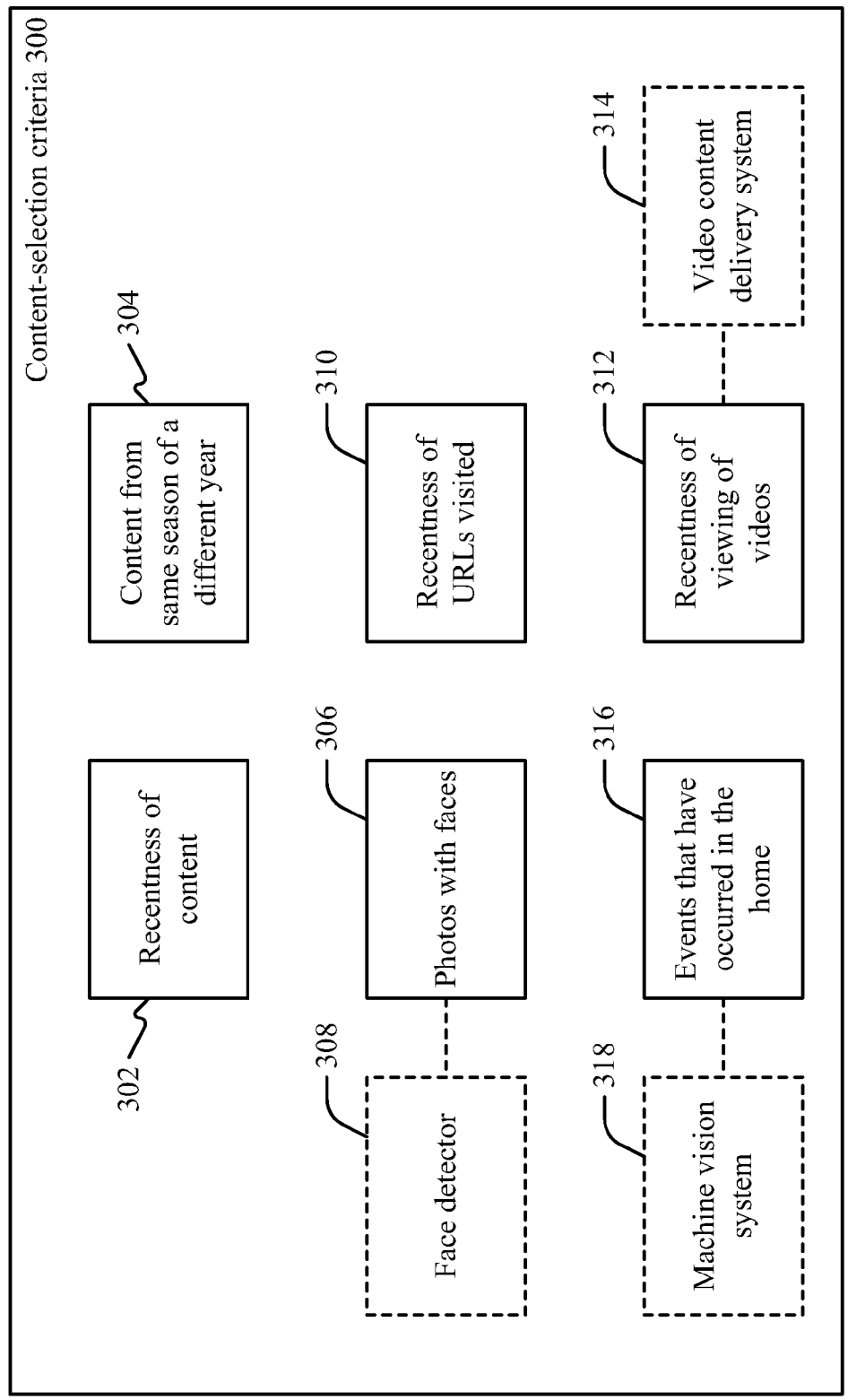
FIG. 3 is a block diagram of example content selection criteria.

When content is selected (as described above in connection with FIG. 1 at 102), the particular choice of content may be based on one or more criteria. Content could be selected based on a pseudo-random factor. Additionally, FIG. 3 shows examples of various other content-selection criteria 300 that may be used to choose a particular content item from some corpus of content.

One example content-selection criterion is the recentness of content (block 302). For example, if the content to be selected for sharing is photos, videos, or the identities of URLs or videos that have recently been visited/viewed, then such content may be selected based on its recentness (e.g., by checking the date on which the video was viewed as recorded by a video content delivery system, or by checking the access date of the URL as recorded in a browsing history, and finding whether such date satisfies a recentness criterion). For example, a photo that was taken the previous week could be chosen in favor of a photo that was taken six months earlier. In addition to photos, other types of content could also be chosen based on recentness.

Another example content-selection criterion is to choose content from roughly the same time of a different year (block 304). For example, if the content that is to be selected for sharing includes photos and the time of year at which the sharing occurs is the winter holidays, then photos from the winter holiday season in a previous year could be selected. The following is one way to implement such a criterion. A date may be defined by a particular year (e.g., 2008) and a particular day within the year (e.g., March 1). A photo may be associated with a date. The date on which the photo is to be shared (the current date) may be compared with the date associated with various photos. A photo may be selected whose year is different from that of the current date, but whose day within the year is somewhat proximate to that of the current date. A proximity criterion could be defined in order to select a photo that is associated with a day that is sufficiently close the current day (but in a different year). The relationship between the days in each date could be assessed to determine whether that relationship satisfies the proximity criterion. For example, a proximity criterion could choose photos that occur within the same month of a different year, or within 30 days of the current date in a different year, etc.

Another example content-selection criterion is to select photos with faces (block 306). Some people may wish to share photos that have faces, on the theory that photos of people may be more interesting to others than photos of objects. Thus, whether the photo has a face could be used as a selection criterion. Face recognition technology may be incorporated into face detector 308, and face detector 308 could be used to decide which photos have faces. (Depending on the sharer, or the context in which the sharing is occurring, there may be reason to share photos with faces or photos without faces. Face detector 308 could be used to select either type of photo.)

As previously noted, URLs that have been visited or identities of videos that have been watched are examples of content items that may be shared. URLs could be selected based on how recently the URLs have been visited (block 310). Similarly, identity of video content that has been watched could be chosen based on how recently a particular video has been viewed (block 312). The date and time at which a particular item of video content had been viewed could be learned by consulting a video content delivery system 314, such as a set-top box.

Another example criterion on which content could be selected is based on physical events that have occurred, such as events that have occurred in a home (block 316). As previously noted, the subject matter described herein may be used to facilitate sharing between extended families. In one example, one family member may be interested in learning what another family member has been doing (e.g., a grandparent may be interested to learn that a grandchild has recently played a particular board game). The fact that such event has occurred could be mined using, for example, a machine vision system 318. For example, machine vision could be used to determine what sort of events are occurring in the grandchild's home, and certain types of events that are observed in this way (e.g., games played, visits from friends, music lessons, etc.) could be chosen as sharable items.

As a further example, content could be selected based on where it is located within a directory structure. For example, a directory of pictures may contain sub-directories organized by general topic (e.g., different vacations, different holidays, etc.). A system could rotate which directories the photos are selected from, so that photos relating to different topics or events could be selected on different days. The system may observe some constraint concerning how many times, or how frequently, a particular directory may be used as a source of content in order to distribute selections somewhat evenly across the different directories. In another example, content items could be associated with some metadata tag (indicating, for example, a geographic location at which a photo was taken, the name of a person in a photo, etc.), and content could be selected based on whether it is associated with a given metadata tag (e.g., a user might explicitly apply a tag to a photo, or give the photo a "star" rating).

As yet a further example, content could be selected based on some quality criterion. For example, photos could be evaluated to determine whether they contain "red-eye" or some other defect. A metric could be used to evaluate photos for defects, and photos could be avoided (or favored) based on whether they meet some level of quality according to that metric.

As to calendar events, the following are some example bases to select content: avoiding (or favoring) recurring calendar events; avoiding (or favoring) events that are scheduled to occur over a period longer than one day (multi-day events); avoiding events marked private, etc.

Additionally, when applying any content-selection criterion to choose a content item, a system that implements the subject matter described herein could avoid a content item that the system has previously selected. For example, if the system is looking for a winter holiday photo, it may find a photo that meets a selection criterion, but if the photo has already been selected for sharing in the past, the system may note this fact and choose another photo to propose for sharing.

As noted above in connection with FIG. 1, the particular entities with whom content is to be shared may be chosen from an entity source 114. Entity source 114 represents the data and/or processes that define which entity(ies) content is to be shared with. FIG. 4 shows examples of data and/or processes that may make up entity source 114.

In one example, entity source 114 takes the form of a set 402 of entities with which content is to be shared. Such a set could be defined, for example, as a list of users (or e-mail addresses of users, or instant messaging addresses of users) who are to receive shared content (e.g., "Mike", "Laura", etc.). There could be a single list of users who receive shared content, or the list could be divided into different groups of users (e.g., groups 404, 406, and 408) who are to receive different types of content. Users may mutually agree to participate in sharing of content, or a sharer could unilaterally add a sharee to his or her list of entities that are to receive shared content.

As another example, the entity source takes the form of an entity-selection process 410, which selects one or more entities to receive content based on various factors. For example, entity-selection process 410 may use rules to identify entities that are to receive content (block 412). These rules may take into account information such as a list of entities 414 (e.g., a list of e-mail contacts), and information about the entities 416 (e.g., whether the entities on the list are business contacts, personal contacts, family contacts, etc.). For example, a system that implements the subject matter described herein might start with the sharer's e-mail contact list, and may choose family contacts on that list as potential candidates to receive shared content. Entity-selection process 410 may also receive input from a person (block 418) to assist in determining which entities are to receive content. For example, if entity-selection process 410 selects family members from an e-mail contact list as possible candidates to receive shared content, input from the sharer may be used to dispose of some of the selected entities and/or to make a designation of entities that were not selected.

Figure 5:
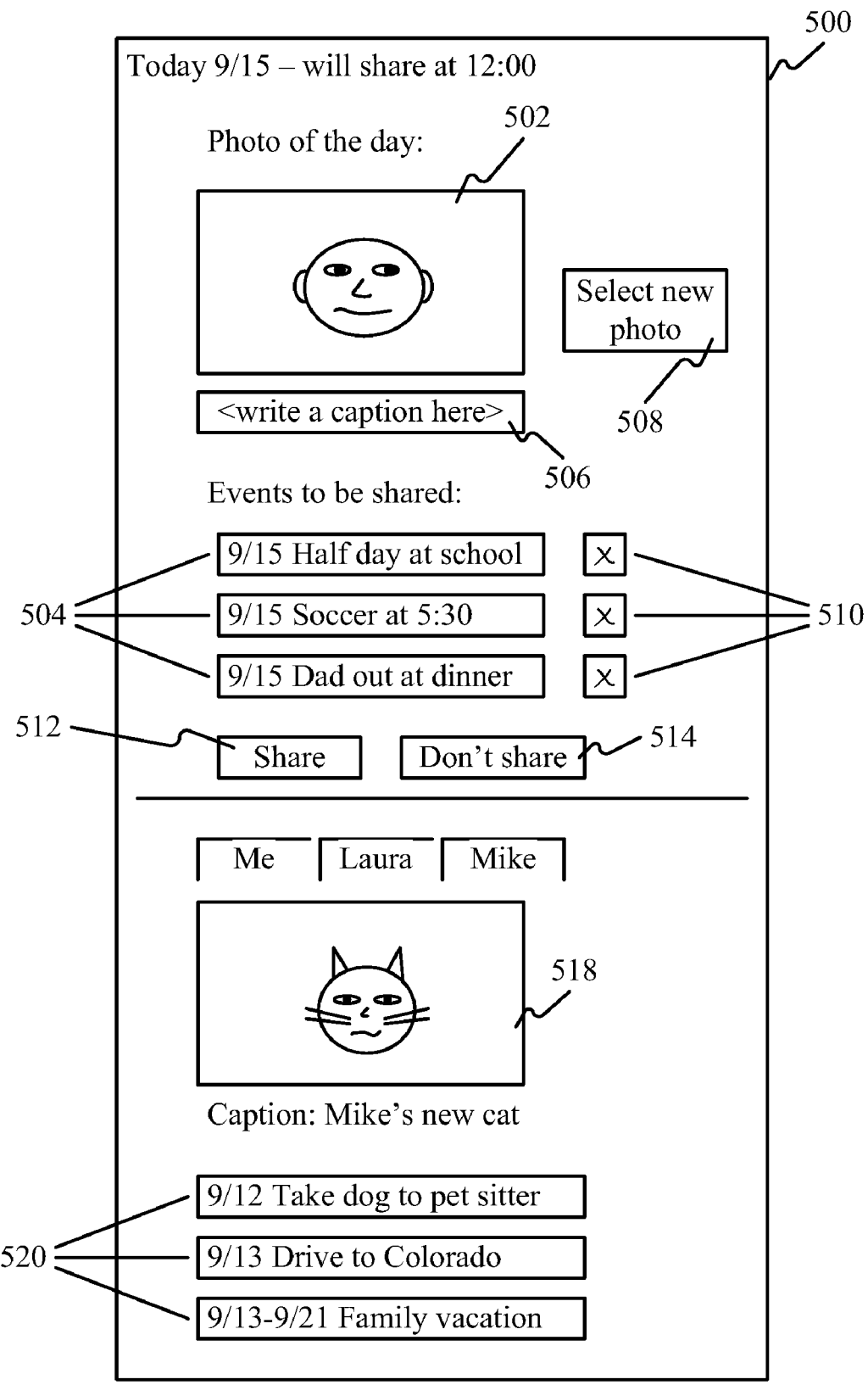
FIG. 5 is a block diagram of an example interface that may be used to propose sharing of content and/or to receive shared content.

FIG. 5 shows an example of an interface 500 that may be used to propose sharing of content and/or to receive shared content. For example, a person who participates in the sharing of content may run a sharing client application on his or her computer. That client application may show interface 500 on the computer's display in order to communicate the proposal to share content and/or to allow the person to interact with the sharing application.

As shown in FIG. 5, interface 500 may present a "photo of the day" 502 and a set of calendar events 504 as items of content that are candidates for sharing. Interface 500 may indicate that the content items shown will be shared at a particular time (e.g., 12:00 in the example of FIG. 5). Displaying content items, along with a statement of when the content is to be shared, is an example of a proposal to share content. Interface 500 may contain a box 506 in which a person may write a caption for the selected photo of the day. Interface 500 may also contain various controls that allow a person to change the content to be shared and/or reject the whole proposal or parts thereof. For example, button 508 ("select new photo") could be clicked. Clicking this button would reject the proposed photo, and, in response, the system could select a new photo (e.g., using selection criteria, as discussed above). Additionally, delete buttons 510 appear next to each of the calendar events 504. Delete buttons 510 allow a person to reject the various calendar events separately. A sharing application may be configured to share n calendar events (e.g., n=3), so deletion of one of the events may result in picking another event from the calendar (e.g., the application could pick the next event that is scheduled to occur later than the deleted event and that is not excluded by some selection criterion). Once the proposal is in a form acceptable to the sharer (either as originally presented, or as modified using buttons 508 and/or 510), the sharer could choose to share the content by clicking button 512, or could cancel sharing by clicking button 514. As another example, the sharer could simply allow the stated time for sharing (e.g., 12:00) to elapse without having taken action, in which case sharing may occur by default. As previously noted, a system that implements the subject matter described herein may share content in a circumstance in which a proposal has not been rejected. Explicit acceptance of the proposal (e.g., by clicking "share" button 512), and tacit acceptance (e.g., by allowing the proposed sharing time to pass without rejection), are both examples of circumstances in which sharing has not been rejected.

Interface 500 may also provide a way to view content that has been shared by others. For example, a sharer may participate in sharing with two other people ("Laura" and "Mike", in the example of FIG. 5), and the bottom portion of interface 500 may be used to show which each entity in the sharing group has shared. For example, interface 500 may present tabs 516 that allow a person to select which entity's shared content. (The "Me" tab may allow the sharer to view his or her own shared content; the "Laura" and "Mike" tabs may allow the sharer to view content shared by others.) In the example of FIG. 5, "Mike's" content has been selected for viewing. Photo 518 and calendar events 520 are content items that Mike has chosen to share, and these items may be shown by interface 500.

Figure 6:
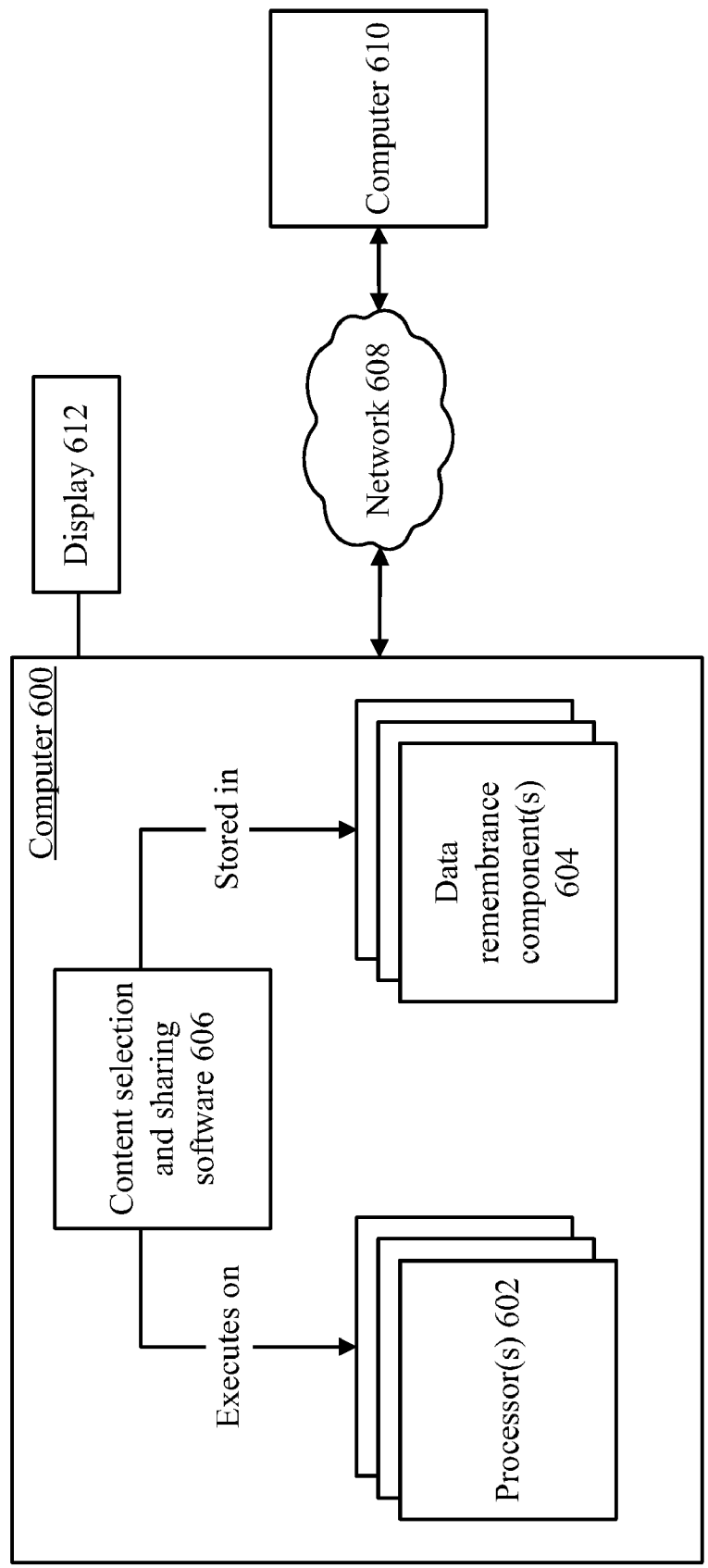
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is content selection and sharing software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as software having instructions to perform one or more acts of a method, where the instructions are stored on one or more computer-readable storage media. The instructions to perform the acts could be stored on one medium, or could be spread out across plural media, so that the instructions might appear collectively on the one or more computer-readable storage media, regardless of whether all of the instructions happen to be on the same medium.

In one example environment, computer 600 may be communicatively connected to one or more other devices through network 608. Computer 610, which may be similar in structure to computer 600, is an example of a device that can be connected to computer 600, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage memories that store executable instructions to perform a method, the method comprising:
   automatically and without direct user intervention, recurrently selecting items of content based on a fact that said items have not previously been selected to be proposed for sharing, there being an item of content that is one of said items;
   displaying a proposal to approve sharing of said item of content;
   allowing a time to elapse without receiving a rejection of said proposal; and
   based on a lack of said rejection, publishing said item of content to an entity that has been previously designated to receive shared content items.

2. The one or more computer-readable storage memories of claim 1, wherein said item of content is associated with a first date, and wherein said selecting comprises:
   determining that said first date is more recent than a second date.

3. The one or more computer-readable storage memories of claim 1, wherein said selecting takes place on a first date defined by a first day and a first year, wherein said item of content is associated with a second date that comprises a second day and a second year, and wherein said selecting comprises:
   determining that a relationship between said first day and said second day satisfies a proximity criterion; and
   determining that second first year and said second year are different years.

4. The one or more computer-readable storage memories of claim 1, wherein said item of content comprises an image, and wherein said selecting comprises:
   determining that said image comprises a face.

5. The one or more computer-readable storage memories of claim 1, wherein said item of content comprises a Uniform Resource Locator (URL) that has been accessed, and wherein said selecting comprises:
   choosing, based on a record of previously-accessed URLs, a URL that is associated with an access date that satisfies a recentness criterion.

6. The one or more computer-readable storage memories of claim 1, wherein said item of content comprises an identification of a video that has been viewed, and wherein said selecting comprises:
   consulting a video delivery system to determine dates on which videos have been viewed; and
   choosing said video from among said videos, based on a finding that a date associated with said video satisfies a recentness criterion.

7. The one or more computer-readable storage memories of claim 1, wherein there is a calendar that comprises a plurality of events, wherein said item of content is one of said events, and wherein said selecting does not select recurring events from said calendar.

8. The one or more computer-readable storage memories of claim 1, wherein there is a calendar that comprises a plurality of events, wherein said item of content is one of said events, and wherein said selecting selects events from said calendar that are scheduled to occur over more than one day.

9. The one or more computer-readable storage memories of claim 1, wherein the method further comprises:
   prior to said displaying of said proposal, receiving, from a person, a designation of said entity as a recipient of shared content items.

10. The one or more computer-readable storage memories of claim 1, there are a plurality of directories in which content items are stored, said item of content being one of said content items, wherein said item of content is located in a first directory that is one of said plurality of directories, and wherein said selecting comprises:
    determining that said first directory satisfies a constraint concerning how many times, or how frequently, said first directory has previously been used as a source of content.

11. One or more computer-readable storage memories that store executable instructions to perform a method, the method comprising:
    automatically, and without direct user intervention, recurrently first selecting items of content based on a criterion, wherein an item of content is one of said items of content, wherein said first selecting of said item of content takes place on a first date defined by a first day and a first year, wherein said item of content is associated with a second date that comprises a second day and a second year, and wherein said criterion comprises said items of content not having been previously selected to be proposed for sharing;
    displaying a proposal to share said item of content;
    receiving, from a person, an first indication that said item of content is to be shared;
    second selecting an entity with which said item of content is to be shared; and
    publishing said item of content to said entity, wherein said first selecting comprises:
    determining that a relationship between said first day and said second day satisfies a proximity criterion; and
    determining that said first year and said second year are different years.

12. The one or more computer-readable storage memories of claim 11, further comprising:
    receiving, from said person, a second indication that said entity is to receive shared content items; and
    based on said second indication, storing a record that that said entity is to receive shared content items;
    wherein said second selecting selects said entity to receive said item of content based on said record.

13. The one or more computer-readable storage memories of claim 11, wherein said criterion comprises a metadata tag, and wherein said first selecting comprises:
    determining that said metadata tag is associated with said item of content.

14. The one or more computer-readable storage memories of claim 11, wherein said item of content comprises an image, wherein said criterion comprises a level of image quality according to a metric, and wherein said first selecting comprises:
    determining that said image has at least said level of quality according to said metric.

15. The one or more computer-readable storage memories of claim 11, wherein said criterion comprises a first date, and wherein said first selecting comprises:
    determining that said item of content is associated with a second date that is at least as recent as said first date.

16. A system comprising:
    a first component that executes on a processor and that receives a selection of one or more entities with whom content is to be shared;
    a second component that executes on said processor, and that, automatically and without direct user intervention, recurrently (a) selects, from a content store, an item of content based on a fact that said second component has not previously selected said item to be proposed for sharing, and (b) communicates, on a display, a proposal to share said item of content; and a third component that executes on said processor, that publishes said item of content to said one or more entities in a circumstance in which said proposal has not been rejected but has not been acted upon, and that does not publish said item of content when said proposal has been rejected.

17. The system of claim 16, wherein said item of content comprises a first image, wherein the system receives a rejection of said proposal and, in response to said rejection, selects, and proposes sharing of, a second image from said content store.

18. The system of claim 16, wherein said item of content comprises a first event from a calendar, wherein the system receives a rejection of said proposal, and wherein the system selects a second event from said calendar that is scheduled to occur later than said first event.

19. The system of claim 16, wherein said item of content comprises an event from a calendar, and wherein said second component, in selecting items of content, selects events on said calendar that are scheduled to occur over a period that is longer than one day.

20. The system of claim 16, wherein said second component selects said item of content from among content items in said content store based, at least in part, on a pseudo-random factor.

* * * * *